(12) United States Patent
Fischer et al.

(10) Patent No.: US 11,809,482 B2
(45) Date of Patent: Nov. 7, 2023

(54) SOURCE IDENTIFYING FORENSICS SYSTEM, DEVICE, AND METHOD FOR MULTIMEDIA FILES

(71) Applicant: Medex Forensics, Inc., Madison, WI (US)

(72) Inventors: Daniel John Fischer, Verona, WI (US); Bertram C. Lyons, Madison, WI (US); Walter Bruehs, Quantico, VA (US)

(73) Assignee: Medex Forensics, Inc., Madison, WI (US)

( * ) Notice: Subject to any disclaimer, the term of this patent is extended or adjusted under 35 U.S.C. 154(b) by 71 days.

(21) Appl. No.: 16/989,153

(22) Filed: Aug. 10, 2020

(65) Prior Publication Data

US 2021/0049199 A1 Feb. 18, 2021

Related U.S. Application Data

(60) Provisional application No. 62/885,472, filed on Aug. 12, 2019.

(51) Int. Cl.
*G06F 16/48* (2019.01)
*G06F 21/55* (2013.01)
(Continued)

(52) U.S. Cl.
CPC ............ *G06F 16/48* (2019.01); *G06F 16/40* (2019.01); *G06F 16/41* (2019.01); *G06F 21/552* (2013.01)

(58) Field of Classification Search
CPC .......... G06F 16/48; G06F 16/40; G06F 16/43; G06F 16/45; G06F 16/483; G06F 16/487; G06F 16/489; G06F 16/41
See application file for complete search history.

(56) References Cited

U.S. PATENT DOCUMENTS 7,349,538 B2 3/2008 Gentry et al.
7,639,818 B2 12/2009 Fujimoto et al.
(Continued)

OTHER PUBLICATIONS

PCT/US2020/045612, International Search Report and Written Opinion dated Nov. 17, 2020, 11 pages—English.
(Continued)

*Primary Examiner* — Vaishali Shah
(74) *Attorney, Agent, or Firm* — Mintz Levin Cohn Ferris Glovsky and Popeo, P.C.

(57) ABSTRACT

A system and method to perform a forensic analysis of a file including: one or more processors; and a memory storing computer-readable instructions that, when executed by the one or more processors, cause the system device to: receive one or more files for analysis; identify a file format for the file; determine whether the file format is a supported multimedia file; parse the file to separate structural elements from the file; generate a profile structural signature for the one or more files; a database including a plurality of profile structural signatures corresponding to known hardware and/or software; determining whether the one or more files matches one of the plurality of profile structural signatures; and providing an indication of an identity of the known hardware and/or software for the one or more files upon a determination that the one or more files matches one of the plurality of profile structural signatures.

19 Claims, 7 Drawing Sheets

(51) Int. Cl.
*G06F 16/41* (2019.01)
*G06F 16/40* (2019.01)

(56) References Cited

U.S. PATENT DOCUMENTS

| | | | |
|---|---|---|---|
| 8,082,236 | B2 | 12/2011 | Aharonov et al. |
| 8,213,618 | B2 | 7/2012 | Dewan et al. |
| 8,364,965 | B2 | 1/2013 | Farrugia et al. |
| 8,447,032 | B1 | 5/2013 | Covell et al. |
| 8,838,984 | B2 | 9/2014 | Aharonov et al. |
| 8,935,745 | B2 | 1/2015 | Brock et al. |
| 9,185,125 | B2 | 11/2015 | Varsanyi et al. |
| 9,215,471 | B2 | 12/2015 | Bonaparte et al. |
| 9,262,419 | B2 | 2/2016 | Dalal et al. |
| 9,547,657 | B2 | 1/2017 | Weinstein et al. |
| 9,729,511 | B2 | 8/2017 | Yan et al. |
| 10,503,923 | B1* | 12/2019 | Gupta ............... G06F 21/6218 |
| 2004/0128511 | A1* | 7/2004 | Sun .................... H04L 9/3247 713/180 |
| 2007/0294311 | A1* | 12/2007 | Gates ................... G06F 16/40 |
| 2009/0225463 | A1* | 9/2009 | Itoh ..................... G11B 19/042 |
| 2012/0096564 | A1 | 4/2012 | Li |
| 2015/0181269 | A1* | 6/2015 | McMillan ....... H04N 21/23418 725/19 |
| 2015/0213324 | A1 | 7/2015 | Farid et al. |
| 2016/0294561 | A1* | 10/2016 | Bäse ..................... G06F 21/64 |
| 2018/0033793 | A1 | 2/2018 | Balakrishnan et al. |
| 2018/0218153 | A1 | 8/2018 | Edwards et al. |
| 2020/0013420 | A1* | 1/2020 | Wallace ............. G06K 9/00543 |
| 2020/0314125 | A1* | 10/2020 | Hall ....................... H04L 51/12 |

OTHER PUBLICATIONS

Gloe, et al., Forensic analysis of video file formats, Digital Investigation 11 (2014) S68-S76.

PCT/US2020/045612, International Search Report and Written Opinion dated Nov. 17, 2020, 11 pages.

D. Handi, et al., "Multimedia File Signature Analysis for Smartphone Forensics", 9th International Conference on Developments in eSystems Engineering, pp. 130-137, 2016 [retrieved on Nov. 4, 2020]. Retrieved from https://www.computer.org/csdl/proceedings-article/dese/2016/07930636/12OmNBV9Idx pp. 130, 132.

Patrick Mullan, et al., Forensic source identification using JPEG image headers: The case of smartphones, Digital investigation, vol. 28, pp. S68-S76, Apr. 2019 [retrieved on Nov. 4, 2020]. Retrieved from https://www.sciencedirect.com/science/article/pii/S174228761930026X, pp. 69, 71, 73-75.

Luis Javier Garcia Villalba, et al., 'Identification of smartphone brand and model via forensic video analysis', Expert Systems With Applications, vol. 55, pp. 59-69, Aug. 2016 [retrieved on Nov. 4, 2020]. Retrieved from https://www.sciencedirect.com/science/article/pii/S095741741600035X, section 4.

Luis Javier Garcia Villalba, et al., "Identification of smartphone brand and model via forensic video analysis", Expert Systems with Applications, vol. 55, pp. 59-69, dated Aug. 2016, [retrieved on Nov. 4, 2020], >https://www.sciencedirect.com/science/article/pii/S095741741600035X< section 4.

\* cited by examiner

SOURCE IDENTIFYING FORENSICS SYSTEM, DEVICE, AND METHOD FOR MULTIMEDIA FILES

CROSS REFERENCE TO RELATED APPLICATIONS

This patent application claims the benefit of and priority to U.S. Prov. Pat. Ser. No. 62/885,472 filed Aug. 12, 2019, the entire contents of which are hereby incorporated herein by reference.

GOVERNMENT LICENSE RIGHTS

This invention was made with Government support under contract numbers DJF-15-1800-P-0004974 (including amendments DJF-17-1200-P-0001851 (including amendments) and DJF-16-1200-P-0004616 (including amendments) awarded by the Federal Bureau of Investigation. The Government has certain rights in the invention.

FIGURE SELECTED FOR PUBLICATION

FIG. 1

BACKGROUND

Technical Field

The present disclosure relates generally to digital file forensics, and more particularly to a hardware and/or software source identifying forensics system, device, and method for multimedia files.

Description of the Related Art

Various file writers, such as electronic devices and/or software are configured to create multimedia content (e.g., audio and visual content). For example, smartphones are mobile computing devices that generally include multimedia functionality, such as, recording audio, picture, and video content, for example. Smartphones include such devices as APPLE's IPHONE, which utilizes the IOS mobile operating system, and GOOGLE's ANDROID mobile operating system, which is utilized on a variety of smartphone devices including those manufactured by SAMSUNG, for example. Some software applications include, for example, ADOBE PREMIER and FFMPEG.

Multimedia is content that may use one or a combination of content forms, such as, text, audio, images, animations, video and interactive content. Multimedia, such as audio and video files, may be saved in various formats, which may include, for example, .wav, .mp3, .mp4, .mov, .wmv, and .avi. File format structures of multimedia files including audio, image, and video recordings, such as sound recordings, photographs, and videos, vary based on the particular file writer (e.g., hardware and/or software) on which the recording had been made. Such variations include differences in acquisition parameters, internal file structure, container formats, and the like. A structural signature of a file includes any or all of such data and may also include additional variables that are caused by the presence or absence of certain metadata that are created by certain software and/or hardware, as well as by, particular codec devices or computer programs that encode or decode a digital data stream or signal. All such data, e.g., metadata and other data, taken together form a signature from which the hardware and/or software device may potentially be ascertained through a forensic analysis of the file.

There are times when a forensic analysis of video file formats, in which the hardware and/or software on which a multimedia file had been made is identified, may be advantageous, such as in the investigation of cybercrimes which may pertain to distribution or possession of certain multimedia files including identifying the source of content and/or whether content has been altered after its creation.

Multiple methods for forensic analysis of video file formats are known, most commonly those that focus on "scene content" within the file, including manipulation detection, or video content authenticity analysis. These methods and approaches are of an entirely different approach than what is disclosed herein because they are concerned with the consistency of the images within the video, e.g., shadows, lighting, density, texture/patterns, gravity, small visible details, body to object contact, skin to skin contact, levels, threshold filters, saturation, edges, color channels, and/or Fast Fourier transform. There are also approaches to forensic analysis of video file formats that focus on "non-scene content." The two most common non-scene content analysis methods include photo response non-uniformity (PRNU), which maps noise patterns in digital camera light sensors to specific digital camera devices, and a more generic approach to extract and analyze embedded metadata from digital files in order to assess the semantic information contained within the file format, e.g., author, description, date created, date modified, GIS data, serial numbers, etc. Both PRNU and standard embedded metadata analysis are entirely different from the approach disclosed herein. PRNU, while source-determining and comparative in nature, measures color sample patterns to map differences in light sensors between different cameras. Semantic metadata analysis is by nature non-comparative and focuses on the examination of investigative information in any single file, focusing on the intelligence that can be extracted from a single piece of evidence. Extended methods for forensic analysis of video file formats using extracted metadata have been discussed in the art such as those discussed in Forensic analysis of video file formats, by Gloe, Fischer, and Kirchner as published in Digital Investigations, Vol. 11, Supp. 1, May 2014, pp. S68-S76, the entire contents of which are hereby incorporated herein in its entirety.

Conventionally, there is no automated or practical approach to identify hardware and/or software sources of multimedia content on a large-scale using file format structural analysis. There is a continuing need for such an automated and practical approach, including systems, devices, and methods that will parse multimedia files and compare them in such a way as to make a determination of the hardware and/or software source for such files.

The foregoing description is provided for background and introductory purposes and shall not be construed as an admission of prior art.

SUMMARY

The present disclosure relates generally to file forensics, and more particularly to a hardware and/or software source identifying forensics system, device, and method for multimedia files.

In an aspect of the present disclosure, a system may be configured to perform a forensic analysis of a file including: one or more processors; and a memory storing computer-readable instructions that, when executed by the one or more processors, cause the system to: receive one or more files for analysis; identify a file format for the file; determine whether the file format is a supported multimedia file; parse the file to separate all or some structural elements from the file; generate a profile structural signature for the one or more files; a database including a plurality of profile structural signatures corresponding to known hardware and/or software; determining whether the one or more files matches one of the plurality of profile structural signatures; and providing an indication of an identity of the known hardware and/or software source for the one or more files upon a determination that the one or more files matches one of the plurality of profile structural signatures.

In a further embodiment of the present disclosure, a Naïve-Bayes classification approach may utilize structural signature information for a file and add it to each of a key and value pair of extracted semantic metadata (e.g., codec name and image or video characteristics such as resolution, frames per second, etc.) and conduct a classification analysis to make a probabilistic determination as to which file in a reference library that analyzed file is most like, wherein the file in the reference library was made using known hardware and/or software.

A method of performing a forensic analysis of a file may include: providing a system including: one or more processors; and a database including a plurality of profile structural signatures corresponding to known hardware and/or software; a memory storing computer-readable instructions that, when executed by the one or more processors, cause the system to: receive one or more files for analysis; identify a file format for the file; determine whether the file format is a supported multimedia file; parse the file to separate all or some structural elements from the file; generate a profile structural signature for the one or more files; determine whether the one or more files matches one of the plurality of profile structural signatures; and provide an indication of an identity of the known hardware and/or software for the one or more files upon a determination that the one or more files matches one of the plurality of profile structural signatures; receiving one or more files for analysis; identifying a file format for the file; determining whether the file format is a supported multimedia file; parsing the file to separate some or all of the structural elements from the file; generating a profile signature for the one or more files; determining whether the one or more files matches one of the plurality of profile signatures; and providing an indication of an identity of the known hardware or software for the one or more files upon a determination that the one or more files matches one of the plurality of profile signatures.

The above and other aspects, features and advantages of the present disclosure will become apparent from the following description read in conjunction with the accompanying drawings, in which like reference numerals designate the same elements.

BRIEF DESCRIPTION OF THE DRAWINGS

A further understanding of the present disclosure can be obtained by reference to a preferred embodiment set forth in the illustrations of the accompanying drawings. Although the illustrated preferred embodiment is merely exemplary of methods, structures and compositions for carrying out the present disclosure, both the organization and method of the disclosure, in general, together with further objectives and advantages thereof, may be more easily understood by reference to the drawings and the following description. The drawings are not intended to limit the scope of this disclosure, which is set forth with particularity in the claims as appended or as subsequently amended, but merely to clarify and exemplify the disclosure.

For a more complete understanding of the present disclosure, reference is now made to the following drawings in which.

DETAILED DESCRIPTION

As required, a detailed illustrative embodiment of the present disclosure is disclosed herein. However, techniques, systems, compositions and operating structures in accordance with the present disclosure may be embodied in a wide variety of sizes, shapes, forms and modes, some of which may be quite different from those in the disclosed embodiment. Consequently, the specific structural and functional details disclosed herein are merely representative, yet in that regard, they are deemed to afford the best embodiment for purposes of disclosure and to provide a basis for the claims herein, which define the scope of the present disclosure. Reference will now be made in detail to several embodiments of the disclosure that are illustrated in the accompanying drawings. Wherever possible, same or similar reference numerals are used in the drawings and the description to refer to the same or like parts or steps.

Figure 1:
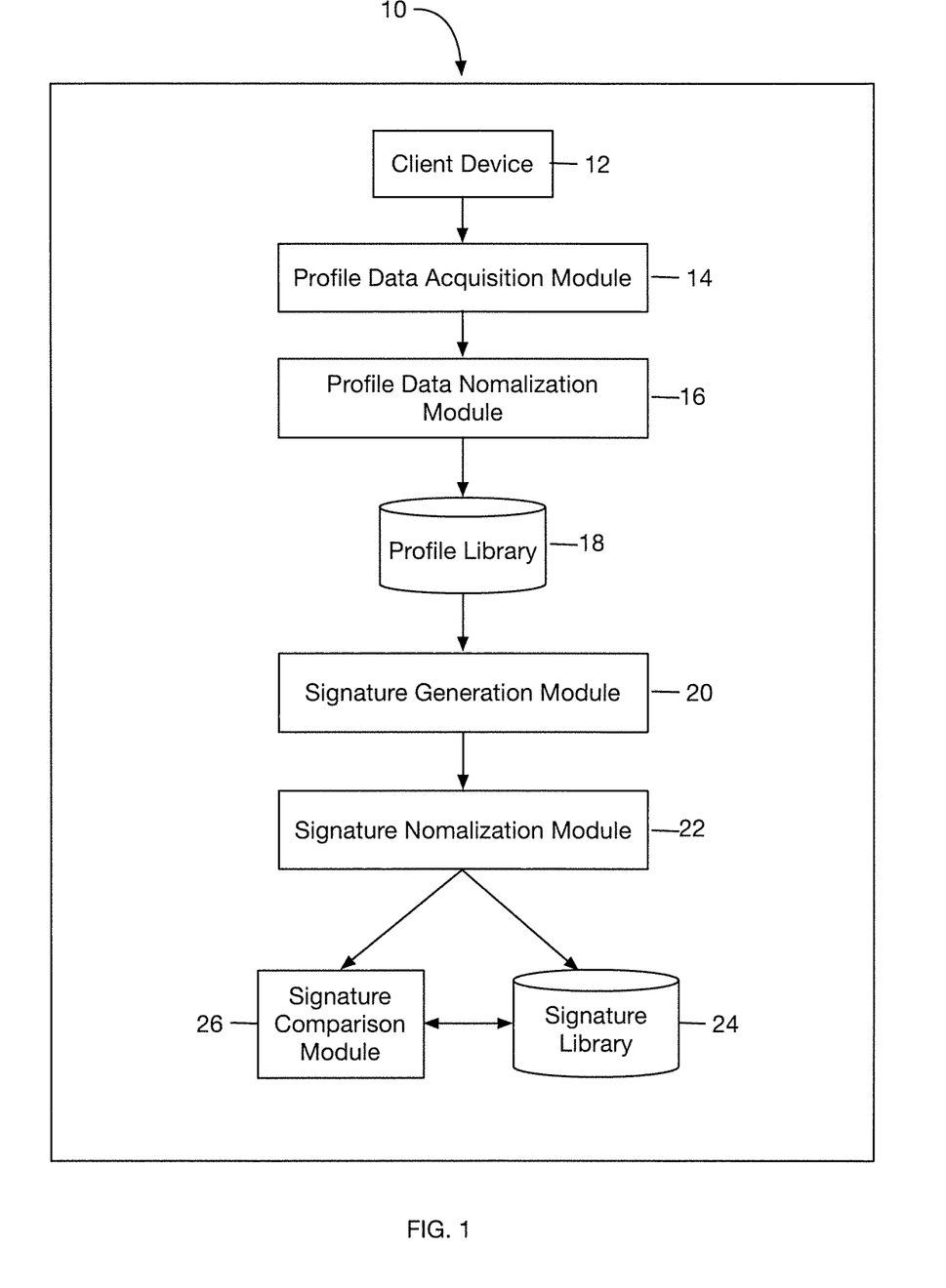
FIG. 1 is a schematic diagram of a source identifying forensics system for multimedia files in accordance with the present disclosure.

A forensics system 10, in accordance with the present disclosure, is illustrated in FIG. 1. The forensics system 10 may include, or may be configured to communicate with, a client device 12 which provides data for analysis by the system 10. The system 10 and/or client device 12 may be a computing device that may include a processor, a memory, a communications interface, a display, and/or an input device.

According to aspects of the disclosure, the processor may include any suitable type of processing circuitry, such as a general-purpose processor (e.g., an ARM-based processor), an application-specific integrated circuit (ASIC), and/or a Field-Programmable Gate Array (FPGA). The memory may include any suitable type of volatile and/or non-volatile memory capable of storing information that is accessible, directly or indirectly, by the processor, such as random-access memory (RAM), read-only memory (ROM), a hard disk (HD), a solid state drive (SSD), a flash memory, an optical disc storage (e.g, DVD, CD-ROM), network accessible storage (NAS), and/or online cloud storage (including related cloud computing web services). The memory stores information accessible by the processor, including instructions that may be executed by the processor. The instructions may be any set of instructions to be executed directly (such as machine code) or indirectly (such as scripts) by the processor. In that regard, the terms "instructions," "steps," "programs," and "applications" may be used interchangeably herein. The instructions may be stored in object code format for direct processing by the processor, or in any other computer language including scripts or collections of independent source code modules that are interpreted on demand or compiled in advance. The instructions may include functions, methods, routines, the like, and/or any combination thereof. The memory stores a database that is accessible by the processor that stores information that may be accessed and/or manipulated by the processor. According to aspects of the disclosure, database may include any suitable type of database, such as a relational database (e.g., Oracle database, IBM DB2, Microsoft SQL Server, MySQL, and PostgreSQL), a non-relational database (e.g, Neo4j, Redis, Apache Cassandra, Couchbase Server), a network database, a hierarchical database, an object-oriented database, a proprietary form of database, and various combinations and configurations of the foregoing. The term "module" used herein may represent, for example, a unit including one of hardware, software and firmware or a combination thereof. The term "module" may be interchangeably used with the terms "unit," "logic," "logical block," "component," and "circuit." The "module" may be a minimum unit of an integrated component or may be a part thereof. The "module" may be a minimum unit for performing one or more functions or a part thereof. The "module" may be implemented mechanically or electronically. For example, the "module" may include at least one of an application-specific integrated circuit (ASIC) chip, a field-programmable gate array (FPGA), and a programmable-logic device for performing some operations, which are known or will be developed. At least a part of devices (e.g., modules or functions of the devices) or methods (e.g., operations) according to various embodiments of the present disclosure may be implemented as instructions stored in a computer-readable storage medium in the form of a module. In the case where the instructions are performed by a processor, the processor may perform functions corresponding to the instructions. The computer-readable storage medium may be, for example, the memory. A computer-readable storage medium may include a hard disk, a floppy disk, a magnetic medium (e.g., a magnetic tape), an optical medium (e.g., CD-ROM, digital versatile disc (DVD)), a magneto-optical medium (e.g., a floptical disk), or a hardware device (e.g., a ROM, a RAM, a flash memory, or the like). The instructions may include machine language codes generated by compilers and high-level language codes that can be executed by computers using interpreters. For example, an electronic device may include a processor and a memory for storing computer-readable instructions. The memory may include instructions for performing the above-mentioned various methods or functions when executed by the processor. The above-mentioned hardware (e.g., devices) may be configured to be operated as one or more software modules for performing operations of various embodiments of the present disclosure and vice versa.

The system 10 may further include a profile data acquisition module 14 which is configured to receive data pertaining to multimedia files. A profile data normalization module 16 normalizes the acquired data by converting the data to a standard format. Based on the profile in the standardized format, a signature generation module 20 generates a structural signature, which is normalized to a standard form by a signature normalization module 22 for storage in a signature library 24. In a situation where the source of the multimedia file is known, the structural signature may be stored in the signature library 24. However, in situations where the source of the multimedia file is unknown, the signature is sent to a signature comparison module 26, which compares the normalized structural signature with those stored in the signature library 24. Upon there being a match of the normalized structural signature with a signature that is stored in the signature library 24, an indication of such a match, including an identification of the hardware and/or software source of the signature that was compared with those of the signature library 24 may be sent to the client device 12. In situations where the match is close, but not identical to those stored in the signature library 24, an indication of a likely file writer (e.g., hardware or software source) may be provided, for example, by providing a percentage probability of a match with a known hardware or software source.

In addition, a Naïve-Bayes classification may be used to perform a probabilistic identification of the signature of the file. A reference library of known structural signatures may be used as a basis for Naïve Bayes classification in combination with selected key and value pairs of metadata extracted from a given file. Together the structural signature and the selected key value pairs form a dataset that distinctly represent the provenance of a given file. A number of probabilistic identification efforts may be performed to identify the closest matching of these datasets contained in the reference library such that various hardware and/or software characteristics of the device that created the video or image may be determined, including such characteristics as those of the hardware (e.g., brand and/or model of the hardware device) and may also determine whether the image and/or video file has been edited or not.

A method for forensic file analysis 100, which may be implemented by the forensics system 10, is now described with respect to FIGS. 2-7.

Figure 2:
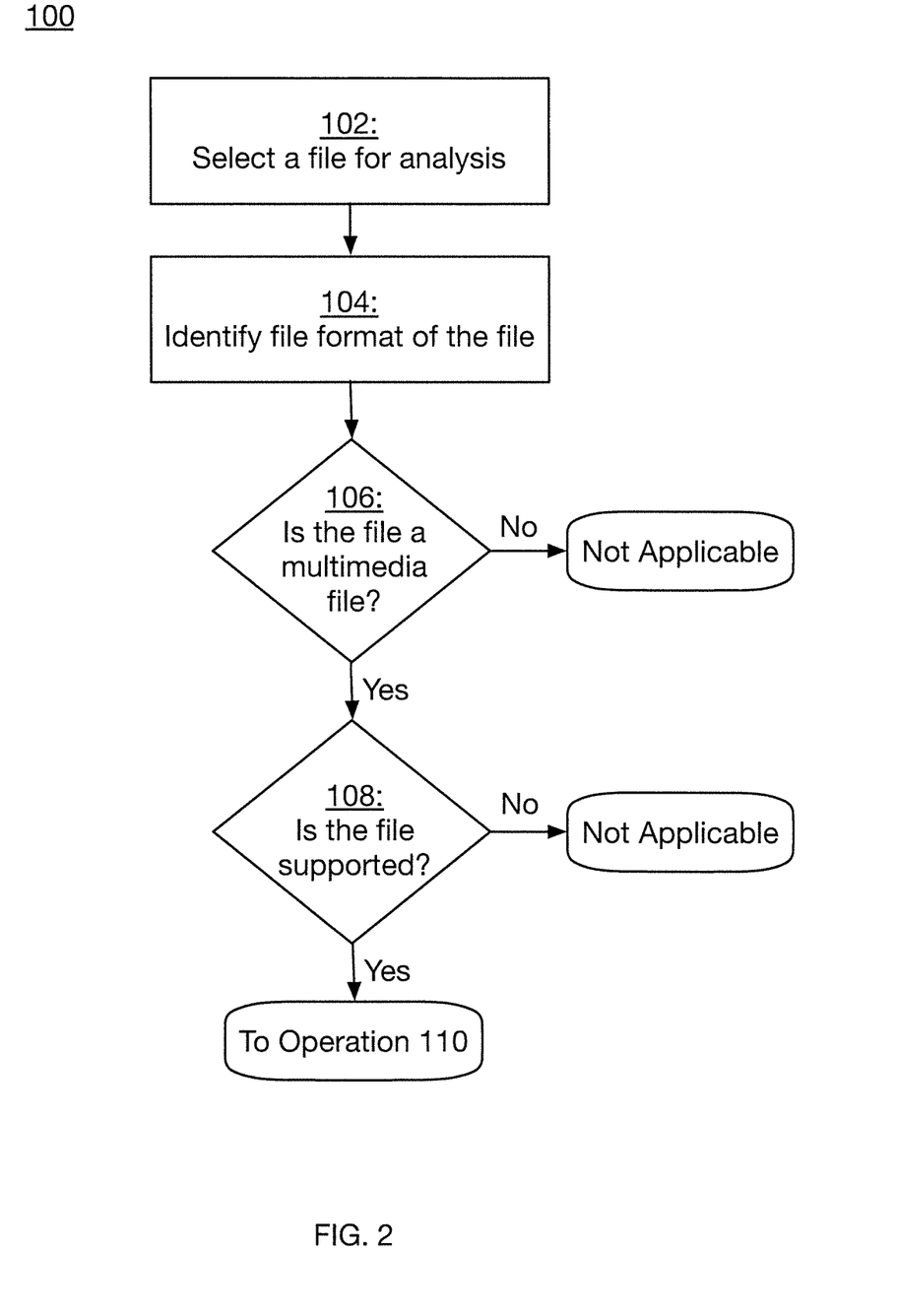
FIGS. 2-6 are flowcharts of a method or process, and sub-steps or subprocesses of the method or process, for generating a structural signature library for a source identifying forensics systems for multimedia files in accordance with the present disclosure.

As shown in FIG. 2, at step 102, a multimedia file is selected for analysis. At step 104, the file format of the file is identified. The format of the file may be identified by any suitable approach, including, for example, a traditional file format signature analysis, like those used by tools such as Siegfried or Apache Tikka, to identify file format. It should be noted that this method, although it sounds similar to a structural signature, is a longstanding approach that identifies a file format in general based on the existence of binary phrases or patterns within a digital file and the best outcome is to say that yes this is a TIFF file or yes this is a MP4; but this approach does not help with identifying the difference between MP4s in such a way as to identify the source device that made them.

At step 106, a determination as to whether the file is a multimedia file may be determined. If the file is not a multimedia file, the process is determined to not be applicable to that file. At step 108, a determination is made as to whether the file is supported to be analyzed by the system 10. For example, the system 10 may support some files formats, but not others, such file formats including, for example, RIFF (AVI) and ISO base media file format (e.g., MP4, MOV, 3G2, 3GP, M4V), but some implementations may support other or additional file formats.

Figure 3:
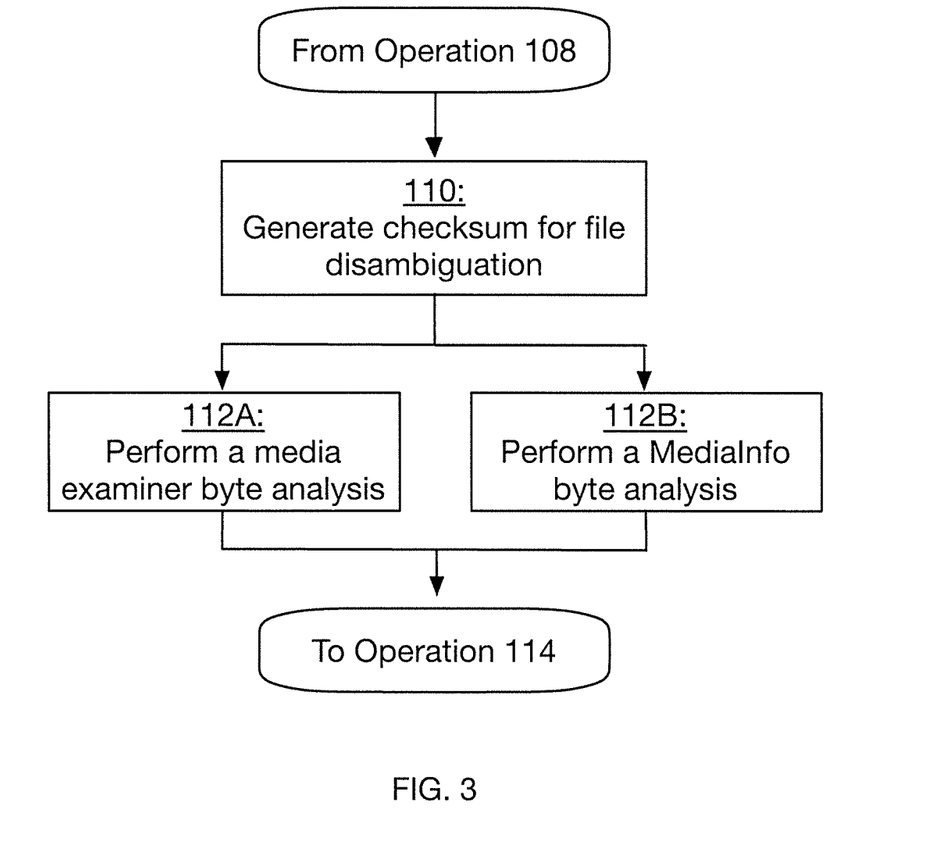

As shown in FIG. 3, at step 110, a checksum (i.e., a numeric value of a fixed length that uniquely identifies a fixed data set) may be generated for file disambiguation. At step 112A, the system 10 performs a Media Examiner byte analysis. Media Examiner is a custom tool built by the Inventors to parse multimedia file formats and report on all byte sequences and offsets within the supported file formats. At step 112B, the system 10 may perform an additional byte analysis, for example by performing a Medialnfo byte analysis or using a similar software, e.g., Exiftool. Medialnfo is a free, cross-platform and open-source program that parses and reports on technical information about media files, as well as tag information for many audio and video files and may be used in many programs such as XMedia Recode, MediaCoder, eMule, and K-Lite Codec Pack. MediaInfo is a tool built by MediaArea to parse and extract semantic metadata from a large range of multimedia file formats in order to report on internal metadata. Unlike Media Examiner, which is disclosed by the present application, the MediaInfo tool will fail if the file is corrupted or incomplete, and it will also ignore internal file structures that it does not recognize. The Media Examiner tool also differs from the MediaInfo tool in that the Media Examiner tool performs structural file analysis and the MediaInfo tool performs a semantic metadata extraction.

In steps 112A and 112B, a file parser may parse the file for RIFF (AVI) and ISO Base Media file format (MP4, MOV, 3G2, 3GP, and M4V, for example). The presently disclosed Media Examiner file parser, at step 112A, is advantageous as compared to conventional parsers because conventional parsers are incapable of parsing broken files having such formats as AVI, WMV, MP4, MOV, 3GP, 3G2, M4V multimedia files that the presently disclosed file parser is configured to parse. At step 112B, a file parser is configured to read file metadata and to report such metadata to a user. The analyses of the file parsers at steps 112A and 112B are combined to make up for any deficiencies that each of the parsers may have and as a sanity test to evaluate the correctness of the calculations of each of the parsers.

Figure 4:
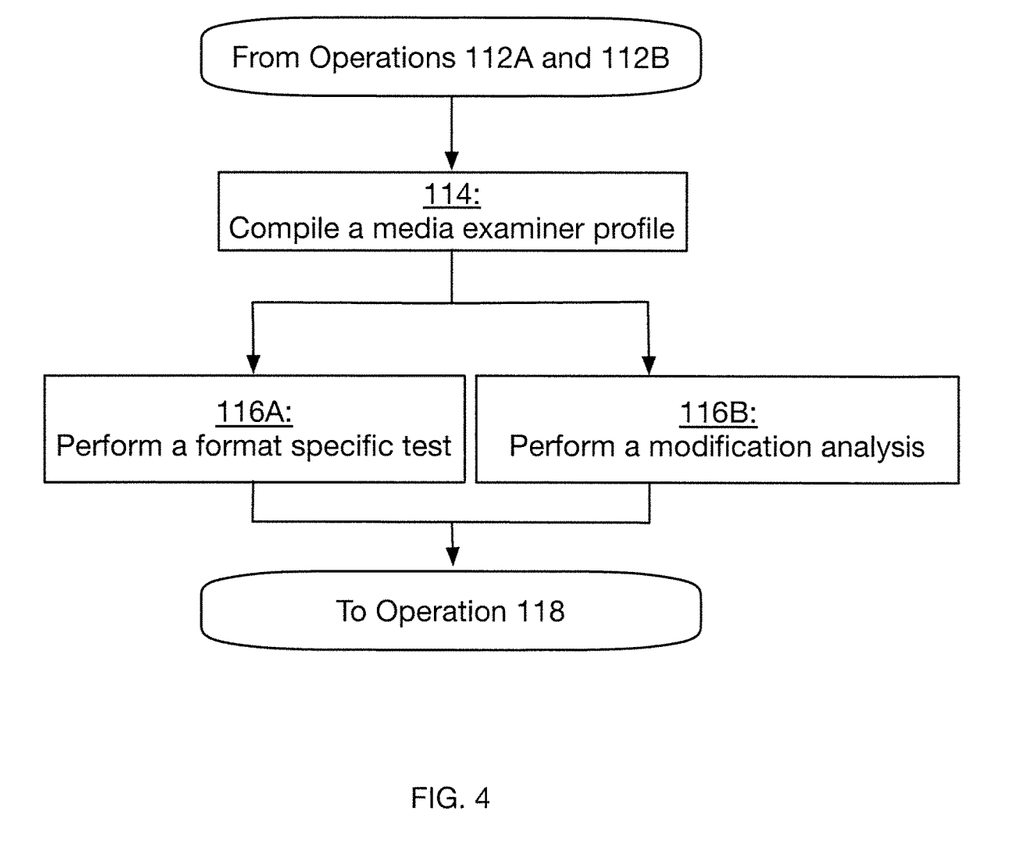

As shown in FIG. 4, at step 114, based on the analyses performed at steps 112A and 112B, a Media Examiner profile may be compiled. In particular, the Media Examiner and MediaInfo outputs from steps 112A and 112B, respectively, are compared and merged to generate a custom Media Examiner profile that is byte accurate for a given supported file type. Based on the compiled Media Examiner profile, a set of format specific tests at step 116A and a set of modification byte analyses are performed at step 116B, respectively. At step 116A, a set of logical custom tests based on normative rules from each supported format specification, i.e., RIFF (AVI), ASF (WMV), and ISO Base Media File Format (MP4, MOV, 3G2, 3GP, and MPV) is performed on the compiled Media Examiner profile data. At step 116B, logical custom tests based on functional elements of each supported format specification, i.e., RIFF (AVI), ASF (WMV), and ISO Base Media File Format (MP4, MOV, 3G2, 3GP, and MPV), may be run against the Media Examiner profile data.

Figure 5:
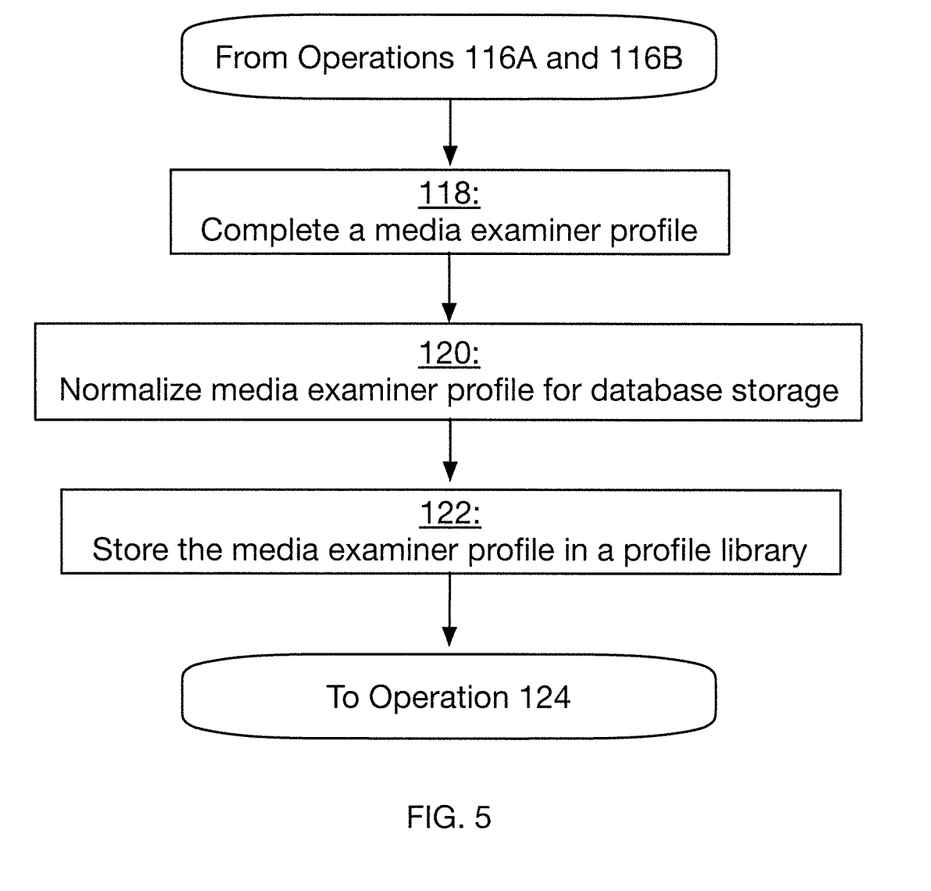

As shown in FIG. 5, at step 118, the results of the validation tests at step 116A and the results of the modification tests at step 116B are added to and included to complete a Media Examiner profile. The results of the tests at steps 116A and 116B may be used for tamper detection reporting and reconstruction support when needed. The completed Media Examiner profile from step 118 may be used for normalizing a Media Examiner profile in step 120 and, at step 122, the normalized Media Examiner profile may then be stored in the profile library 18. Normalizing of the data, in step 120, may be performed via a process of extracting common entities from a data schema (e.g., in the Media Examiner profile.xml there are <block> and <data> elements that store the format structural elements) and storing them into a relational database while retaining the relationships but also simultaneously reducing the amount of data to be stored overall. In this process, the data is transformed from XML to normalized relational structures that will be stored in a relational database. At step 124, a profile structural signature is generated, which may include a first structural signature and a second structural signature.

When creating the profile structural signature, the names of each structures in the file may be identified in order to construct a hierarchical signature for comparison against known signatures contained in a library or database of structural signatures. In the first structural signature, as discussed herein, structures that are named "trak" (in MP4, MOV, 3G2, 3GP, and M4V files) or "00db" (in AVI files) and their child structures are removed. In contrast, the second structural signature is a more specific version of the first signature and includes file structures that are named "trak" (in MP4, MOV, 3G2, 3GP, and M4V files). After making comparisons using both the first structural signature and the second structural signature, a Naïve Bayes classification step is also performed using the signatures as well as key and value pair semantic metadata elements from within each file.

The "trak" structures within MP4, MOV, 3G2, 3GP, and M4V files may include various file structures that include data pertaining to, for example, creation and edit dates, an edit list, data reference information, handler information (e.g., various types of information such as visual, audio, BIFS, etc.), a sample table, etc. A sample table may provide information or instructions as to how an MP4, MOV, 3G2, 3GP, or M4V file, for example, may be decoded and reconstructed for presentation on a timeline. Additional information in the "trak" structure may include information on how to decode the image or audio content within the file for example whether such information is visual or audio and how to set up each decoder to understand the coded data (e.g., whether the audio is AAC or MP3, for example) and knowing the corresponding audio or visual object type and decoder specific information and information for the decoder pertaining to the media format and the parameters that the decoder needs.

When performing a structural signature comparison, a Naïve Bayes classification process may be used that may include key and value pairs of metadata of the multimedia file, for example. The metadata may include such semantic information such as frames per second, video encoding type, audio encoding type, etc. The Naïve Bayes classifier uses all or some of the characteristics of the file, as well as the generated first and second structural signatures and compares such characteristics to those of the files contained in the reference library or database. A plurality of Naïve Bayes classifiers may be used to determine a variety of forensic information about the file. The plurality of Naïve Bayes classifiers may include: a brand classifier, i.e., the classifier determines the brand of the device that created the file (e.g., SAMSUNG or APPLE, etc.); a model classifier, i.e., the classifier determines the model that created the file (e.g., iPhone 11); a software classifier, i.e., the classifier determines whether the file was edited by a software editing program. It should be noted that the Bayes classifier(s) are used during an analysis of an unknown file as compared to known files contained in the reference library; it is not used when creating structural signatures of known files to add them to the reference library.

The profile structural signature may be generated by looking for those structures within the file that have a name that is shorter than a predetermined number of characters, e.g., four characters or shorter than five characters long but longer than two characters. The reason for this is that valid MP4, MOV, 3G2, 3GP, M4V, or AVI structures have four-character codes (4CCs). 4CCs are 4 characters, and those are largely the target for comparisons, as the relevant multimedia file formats MP4, MOV, 3G2, 3GP, M4V, or AVI structures tend to be based on 4CCs. However, in some implementations, some pseudo-structural labels (labels generated by the Media Examiner custom byte parser or by MediaInfo parsers) that are shorter or longer than 4 characters may be relevant for some metadata values found commonly within files. There are some base64 encoded metadata structures in MP4s that are common and these may also be included in profile signatures. Additionally, ASF (WMV) file formats use much longer structural names (e.g., 16 byte-length names), and for these formats the 4-character limit approach is irrelevant.

There are other structures in the XML profile that are data structures that include information about sub-structural information that have names that are longer than four characters. Additionally, a few four-character words are removed because they are known to not be valid 4CCs. Data structures that because of various characteristics, e.g., size, name, kind, data, wave, sei, trak, and type, may also be removed. To reduce noise from AVI files, other structures may be ignored when trying to determine those structures that are resultant because of the hardware and/or software that was used. For example, structures that start with the number 0 and are four characters long may be similarly ignored. For example, in AVI files, each video frame may be stored in a structure (this is not the case with MP4s, where all video frames can be found within one structure). Because of this AVI's have thousands of structures that are repeated structures that hold individual frames of video or samples of audio. These all start with "0", and they are the only AVI structures that start with "0", so they are removed from a signature because the quantity of frames in a video is not a function of the source of the video, but instead the duration of the video.

Also, in the first structural signature, parent structures called "trak" and any of their descendants within the hierarchy may be removed. This accounts for the possible variety of media sample tracks that might be included or excluded from a given ISO Base Media File Format (MP4, MOV, 3G2, 3GP, and M4V) file even when coming from the same source hardware or software.

As noted above, the generated structural signature may include a first structural signature and a second structural signature. The second signature is substantially the same as the first signature except that it does not remove the data structures called "trak" and its substructures or subsequent children. This permits the second signature to be affected by the type of codecs, which are documented within the "trak" structures of the image or video files (e.g., MP4, MOV, 3G2, 3GP, and M4V) that are present within the file. Thus, the second structural signature offers more specific matches than the first structural signature.

Figure 6:
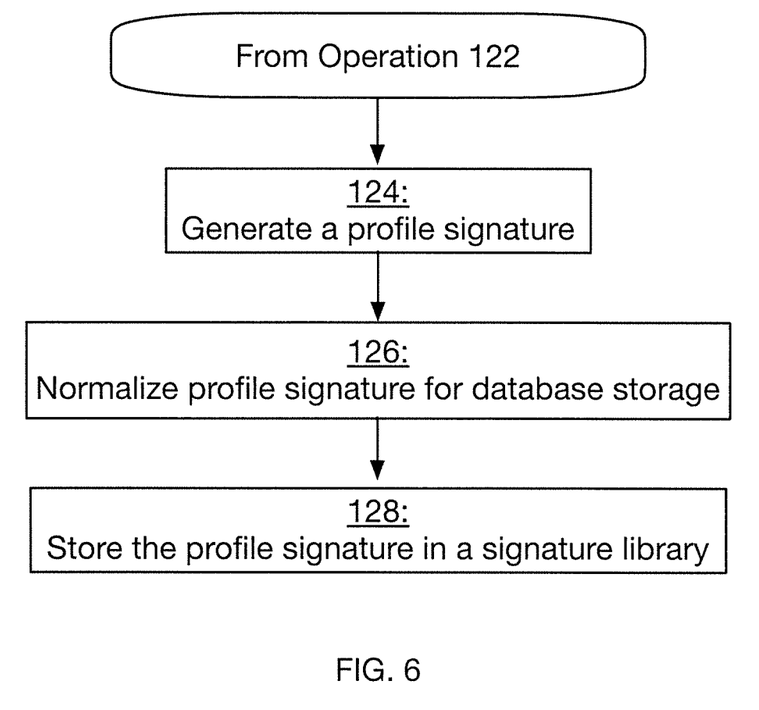

At step 128, structural signatures may be stored for all files processed in the Media Examiner system. A large signature library has been built from verifiable sample files from known sources (i.e., the original camera brand and model is known and documented for each file). Unknown file signatures are compared to this source library to identify a match and to report on probable hardware and/or software source of the analyzed file. For example, the brand and/or model for the electronic device or software that created the media file in question, or the name and version of the software that last edited the file may be identified.

When performing a structural query for generating a signature that is relevant for a particular hardware and/or software source, the structural signature query looks for all structures in the file that have a name shorter than five characters long, but longer than two characters. The reason for this is that valid MP4, MOV, 3G2, 3GP, M4V, and AVI structures have four-character codes (4CCs). There are other structures in the XML profile that are data structures that include information about sub-structural information that have names that are longer than four characters. Additionally, a few four-character words are removed because they are known to not be valid 4CCs and may be based on "Size", "Name", "Kind", "Data", "Wave", "sei", "trak", and "type"). To reduce noise from AVI files, any structures that start with the number "0" and are four characters long may be ignored. This removes all individual content-based frame structures that appear within an AVI file. Also, in this signature, the parent structure called "trak" and any of its descendants within the hierarchy may be removed. This accounts for the possible variety of tracks that might be included or excluded from a given ISO Base Media File Format (MP4, MOV, 3G2, 3GP, and M4V) file even when coming from the same source hardware or software. When creating the first structural signature, we can remove "trak" from that signature, but not when creating the second structural signature, as discussed above.

TABLE 1

Example output of the structural signature query for a given file:

| Structure Name | File ID | Block Count | Position | Depth |
| --- | --- | --- | --- | --- |
| ftyp | 8885 | 1 | 1 | 0 |
| wide | 8885 | 1 | 2 | 0 |
| mdat | 8885 | 1 | 3 | 0 |
| moov | 8885 | 1 | 4 | 0 |
| mvhd | 8885 | 1 | 5 | 1 |
| udta | 8885 | 1 | 6 | 1 |

This output information (basically, a table with five relevant columns) documents the distinct appearances of structure headings within the file, the position in sequence of each, and the relative depth within the hierarchy of each. A structural signature query may represent a unique pattern for a particular source file writer, e.g., the embedded code within a camera chip, or the software code within an iPhone, or the code base within an editing program such as Adobe Premier. This pattern can be connected to the original source software or hardware that wrote the file most recently. This structural signature may not be unique to a file like a hash value would be, but would instead be unique (or distinct) to the source. Comparing the structural signature output between two files can demonstrate similarity and/or difference between sources.

For example, in Table 2 below, comparing the above file with a different file yields the following output, comparing file ID 8595 to file ID 8601:

TABLE 2

Comparing Structural Signature of File ID 8595 to that of File ID 8601

| Matches | Block Count | Match Percent | File Id |
| --- | --- | --- | --- |
| 3 | 13 | 0.230769230 | 8601 |

In the above example, 13 unique possible block comparisons, only three matched (with regard to name, position, and hierarchy), and a percentage match would be about 23 percent (i.e., 3/13). Viewing these files' structural signatures side by side, gives visibility to the above calculations, as shown in Tables 3 and 4 below.

TABLE 3

Structural Signature Comparison for File ID 8595

| Structure Name | File ID | Block Count | Position | Depth | Match? |
| --- | --- | --- | --- | --- | --- |
| ftyp | 8595 | 1 | 1 | 0 | Yes |
| moov | 8595 | 1 | 2 | 0 | Yes |
| mvhd | 8595 | 1 | 3 | 2 | Yes |
| meta | 8595 | 1 | 4 | 2 | No |
| hdlr | 8595 | 1 | 5 | 4 | No |
| keys | 8595 | 1 | 6 | 4 | No |
| ilst | 8595 | 1 | 7 | 4 | No |
| free | 8595 | 1 | 8 | 0 | No |
| mdat | 8595 | 1 | 9 | 0 | No |

TABLE 4

Structural Signature Comparison for File ID 8601

| Structure Name | File ID | Block Count | Position | Depth | Match? |
| --- | --- | --- | --- | --- | --- |
| ftyp | 8601 | 1 | 1 | 0 | Yes |
| moov | 8601 | 1 | 2 | 0 | Yes |
| mvhd | 8601 | 1 | 3 | 2 | Yes |
| free | 8601 | 1 | 4 | 0 | No |
| mdat | 8601 | 1 | 5 | 0 | No |
| uuid | 8601 | 2 | 6 | 0 | No |
| uuid | 8601 | 2 | 7 | 0 | No |

In the above examples of Tables 3 and 4, File ID 8595 is an MP4 file created by a Motorola Moto Z Play, while File ID 8601 is a MP4 file created by a Sony Z3. Knowing these sources is important, because we can use this known information to demonstrate the method disclosed herein, i.e., determination of the accuracy of the determination of a hardware and/or software source based on the generated structural signatures of a multimedia file. Two files created from the same generation device running the same operating system and firmware versions (e.g., two Motorola Moto Z Play devices) will have a perfect structural match, and therefore the outcome of the above comparison would be a 100% match. There would be no difference between the appearance of structures and the frequency of those appearances. For example, following is the output of such a comparison (between File ID 8595 and File ID 8596, both MP4 files created directly by a Motorola Moto Z Play), as shown in Table 5 below.

TABLE 5

Output of a Comparison of Structural Signatures Between Outputs of an MP4 File Created on two instances of the Same Device, i.e., a Motorola Moto Z Play

| Matches | Block Count | Match Percent | File Id |
| --- | --- | --- | --- |
| 9 | 9 | 1 | 8596 |

In other words, as shown in Table 5 above, since the two different MP4 files were created on instances of the same device, the system 10 has determined that the match percent is 1 or 100%, which indicates the file writer (e.g., hardware and/or software source) for both files.

In order to facilitate a rapid comparison, the method described herein includes a workflow that uses the structural signature query above to compare a given file to each file in the database. This loop keeps track of total number of structures, matched number of structures, and percentage of match and outputs a list of all files compared and the percentage by which their structural signatures are a match.

This comparison can be performed against all profiles in the database or excluding/including files based on known profile IDs or known source values. This comparison is blind to any non-structural semantic information in the file that might suggest the original source. It is purely a comparison of structural elements within the file.

Figure 7:
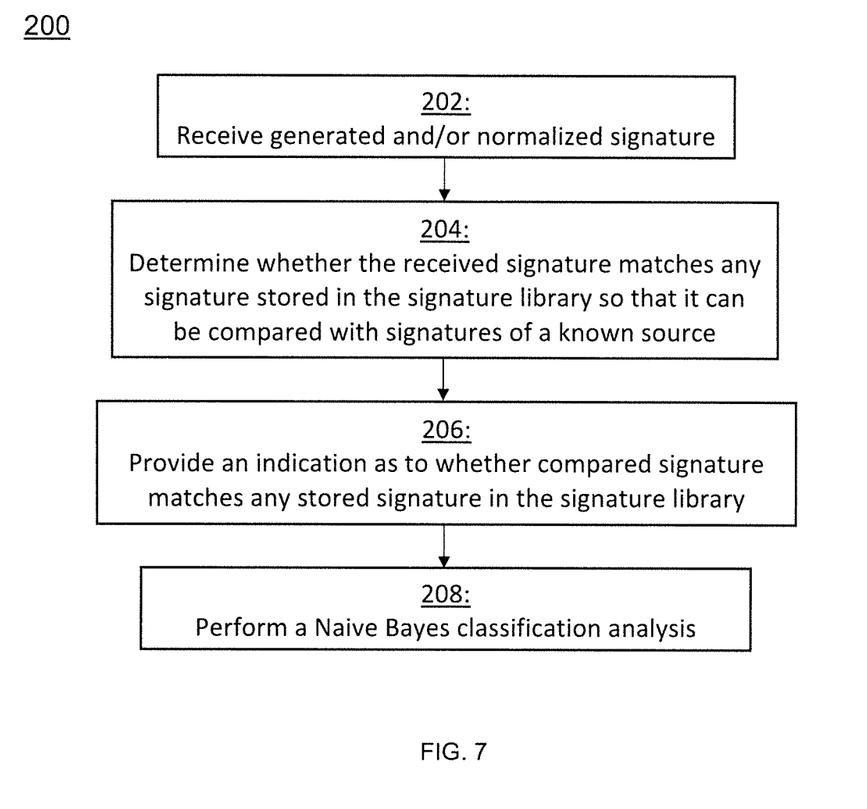
FIG. 7 is a flowchart of a process for determining the file writer (e.g., hardware and/or software) source of a multimedia file in accordance with the present disclosure.

A method 200 for comparing signatures and determining a hardware source is described with respect to FIG. 7 in which at step 202, the received and/or normalized structural signature that was created through the method 100, described above, is compared with structural signatures of known hardware at step 204. In other words, comparing the structural signature output between two files can demonstrate similarity and/or difference. Each node in a structural signature is compared (based on name and location in the sequence) to all other signatures in the Library. 100% matches demonstrate similarity, and these are clustered together to represent distinct structural signatures. At step 206, an indication as to whether the received structural signature matches any stored structural signature and is thus of a known hardware and/or software source may be provided. Signature matches inherit the known-source (i.e., brand and model) information from the reference library. At step 208, a Naïve Bayes classification step may be performed using the signatures as well as key and value pair semantic metadata elements from within each file. As already discussed, the Naïve-Bayes classification may be used to perform a probabilistic identification of the signature of the file.

The presently disclosed systems, devices, and methods are advantageous for numerous reasons. For example, a single file can contain thousands of structural components internally. Developing a custom parser takes a considerable amount of work, especially in light of the desire to be able to parse broken or tampered files. The term "Media Examiner" refers to a tool in accordance with the present disclosure that is configured to parse video files in order to identify every binary structure in the file, even if the structures are malformed, or if the file is incomplete. In other words, the Media Examiner parser is designed to function when faced with problematic files. Developing an algorithm to reduce the thousands of parsed structures into a meaningful structural signature is one of the significant achievements of our approach. Additionally, comparing these structural signatures effectively would have been impra.cfical using prior conventional methods.

Advantageously, by identifying source devices/software by their structural signatures, this provenance information can be verified or identified if unknown. In law enforcement use cases, the provenance of an unknown media file can be identified; the provenance of a known media file can be verified; or the presumed provenance of a known media file can be disproven. Structural signature analysis can also provide support for file format provenance analysis in cases where internal metadata has been intentionally tampered with.

Having described at least one of the preferred embodiments of the present disclosure with reference to the accompanying drawings, it is to be understood that such embodiments are merely exemplary and that the disclosure is not limited to those precise embodiments, and that various changes, modifications, and adaptations may be effected therein by one skilled in the art without departing from the scope or spirit of the disclosure as defined in the appended claims. The scope of the disclosure, therefore, shall be defined solely by the following claims. Further, it will be apparent to those of skill in the art that numerous changes may be made in such details without departing from the spirit and the principles of the disclosure. It should be appreciated that the present disclosure is capable of being embodied in other forms without departing from its essential characteristics.

What is claimed is:

1. A method of performing a forensic analysis of a multimedia file, comprising the steps of:
providing a system including:
one or more processors; and
a database including a plurality of profile structural signatures corresponding to at least one of known hardware and software;
a memory storing computer-readable instructions that, when executed by the one or more processors, cause the system to:
receiving a multimedia file for analysis;
identifying a multimedia file format of the multimedia file;
determining whether a multimedia file type of the multimedia file is a supported multimedia file;
parsing the multimedia file to separate structural elements of the multimedia file, wherein the structural elements that are parsed include complete binary structures and incomplete binary structures in the multimedia file;
generating at least one Media Examiner profile structural signature for the multimedia file that characterizes a combination of attributes specific to a type of device that wrote the multimedia file, the combination of attributes including an appearance of a structure heading within the multimedia file, a position of the structure heading within a sequence of a plurality of structure headings within the multimedia file, and a relative depth of the structure heading within a hierarchy of the plurality of structure headings within the multimedia file;
determining a percentage match of the generated at least one Media Examiner profile structural signature with the plurality of profile structural signatures of the database; and
providing an indication of the at least one of the known hardware and software of at least one of the plurality of profile structural signatures when at least one of the plurality of profile structural signatures has a percentage match with the generated at least one Media Examiner profile structural signature that satisfies a predetermined value.

2. The method of claim 1, wherein:
the generated at least one Media Examiner profile structural signature includes at least a first structural signature and a second structural signature.

3. The method of claim 2, wherein:
the first structural signature includes a first grouping of data structures; and
the second structural signature includes a second grouping of data structures, the second grouping including a greater number of data structures than the first grouping.

4. The method of claim 3, wherein:
the second grouping includes "trak" structure(s) for MP4, MOV, 3G2, 3GP, and M4V files and the first grouping excludes the "trak" structure(s).

5. The method of claim 1, further comprising:
a Naïve Bayes classification of data structures and semantic metadata contained in the generated at least one Media Examiner profile structural signature with respect to the plurality of profile structural signatures of the database.

6. The method of claim 1, further comprising the steps of:
normalizing the generated at least one Media Examiner profile structural signature and transforming the generated at least one Media Examiner profile structural signature into a normalized Media Examiner profile structural signature; and
wherein at the step of determining a percentage match, the normalized Media Examiner profile structural signature is compared to the plurality of profile structural signatures of the database.

7. The method of claim 6, further comprising the step of:
storing the normalized Media Examiner profile structural signature in the database.

8. The method of claim 1, wherein:
parsing the multimedia file to separate structural elements of the multimedia file comprises performing a plurality of media byte analyses.

9. The method of claim 8, wherein:
the plurality of media byte analyses include:
parsing structural elements contained in the multimedia file; and
parsing semantic metadata contained in the multimedia file.

10. The method of claim 1, further comprising:
performing one or more validation tests based on the generated at least one Media Examiner profile structural signature;
performing one or more modification byte analysis test.

11. A system configured to perform a forensic analysis of a multimedia file, comprising:
one or more processors; and
a database including a plurality of profile structural signatures corresponding to known hardware and/or software; and
a memory storing computer-readable instructions that, when executed by the one or more processors, cause the system to:
receive a multimedia file for analysis;
identify a multimedia file format for the multimedia file;
determine whether a multimedia file type of the multimedia file is a supported multimedia file;
parse the multimedia file to separate structural elements of the multimedia file, wherein the structural elements that are parsed include complete binary structures and incomplete binary structures in the multimedia file;
generating at least one Media Examiner profile structural signature for the multimedia file that characterizes a combination of attributes specific to a type of device that wrote the multimedia file, the combination of attributes including an appearance of a structure heading within the multimedia file, a position of the structure heading within a sequence of a plurality of structure headings within the multimedia file, and a relative depth of the structure heading within a hierarchy of the plurality of structure headings within the multimedia file;
determine a percentage match of the generated at least one Media Examiner profile structure signature with the plurality of profile structural signatures of the database; and
provide an indication of the at least one of the known hardware and software of the at least one of the plurality of profile structural signatures-when the at least one of the plurality of profile structural signatures has a percentage match with the generated at least one Media Examiner profile structural signature that satisfies a predetermined value.

12. The system of claim 11, wherein:
the generated at least one Media Examiner profile structural signature includes at least a first structural signature and a second structural signature.

13. The system of claim 12, wherein:
the first structural signature includes a first grouping of data structures; and
the second structural signature includes a second grouping of data structures, the second grouping including a greater number of data structures than the first grouping.

14. The system of claim 13, wherein:
the second grouping includes "trak" structure(s) for MP4, MOV, 3G2, 3GP, and M4V files and the first grouping excludes the "trak" structure(s).

15. The system of claim 11, further comprising:
a Naïve Bayes classification of data structures and semantic metadata contained in the generated at least one Media Examiner profile structural signature with respect to the plurality of profile structural signatures of the database.

16. The system of claim 11, further comprising:
normalizing the generated at least one Media Examiner profile structural signature and transforming the generated at least one Media Examiner profile structural signature into a normalized Media Examiner profile structural signature; and
wherein at the step of determining a percentage match, the normalized Media Examiner profile structural signature is compared to the plurality of profile structural signatures of the database.

17. The system of claim 16, further comprising:
storing the normalized Media Examiner profile structural signature in the database.

18. The system of claim 11, wherein:
parsing the multimedia file to separate structural elements of the multimedia file comprises performing a plurality of media byte analyses.

19. The system of claim 18, wherein:
the plurality of media byte analyses include:
parsing structural elements contained in the multimedia file; and
parsing semantic metadata contained in the multimedia file.

* * * * *